E. P. WETMORE.
LABELING MACHINE.
APPLICATION FILED NOV. 15, 1912.

1,102,832.

Patented July 7, 1914.
10 SHEETS—SHEET 1.

Fig.1.

WITNESSES

INVENTOR

Fig. 3.

E. P. WETMORE.
LABELING MACHINE.
APPLICATION FILED NOV. 15, 1912.

1,102,832.

Patented July 7, 1914.
10 SHEETS—SHEET 5.

WITNESSES
R A Balderson
H M Corwin

INVENTOR
E. P. Wetmore
by Bakewell, Byrnes Parmelee
Attys.

E. P. WETMORE.
LABELING MACHINE.
APPLICATION FILED NOV. 15, 1912.

1,102,832.

Patented July 7, 1914.
10 SHEETS—SHEET 7.

E. P. WETMORE.
LABELING MACHINE.
APPLICATION FILED NOV. 15, 1912.

1,102,832.

Patented July 7, 1914.
10 SHEETS—SHEET 9.

WITNESSES

INVENTOR
E. P. Wetmore,

UNITED STATES PATENT OFFICE.

EARL PORTER WETMORE, OF TOLEDO, OHIO.

LABELING-MACHINE.

1,102,832.  Specification of Letters Patent.  Patented July 7, 1914.

Application filed November 15, 1912. Serial No. 731,643.

*To all whom it may concern:*

Be it known that I, EARL PORTER WETMORE, a resident of Toledo, in the county of Lucas and State of Ohio, have invented a new and useful Improvement in Labeling-Machines, of which the following is a full, clear, and exact description, reference being had to the accompanying drawings, forming part of this specification, in which—

Fig. 2 is a side elevation of the machine with the driving wheel omitted; Fig. 2ª is a detail view of the friction device.

My invention has relation to a machine for putting labels upon bottles, jars, cans or other receptacles automatically, and is designed to provide a machine of this character which is simple in its operation, which will do the work without manual handling of the bottles or other receptacles, which will apply the labels thereto with any required degree of pressure, and which is rapid in its operation, and thereby effects a large saving in time and labor.

The embodiment of my invention shown in the accompanying drawings is a machine of the duplex type, which I prefer, in order to double the rapidity of operation over single type machines. Many of the features of my invention are, however, equally applicable to single type machines. While, as above stated, my invention is applicable to applying labels to various receptacles, in the following description I will, for the sake of brevity, consider the receptacles to which the labels are applied as bottles, but this terms will be understood as including various other receptacles.

*General nature and operation of the machine.*—The machine consists of a feed-in conveyer adapted to feed the bottles successively into the machine; two sets of label-feeding, pasting and applying mechanisms, one set being arranged on either side of the center line of travel of the incoming bottles; a transfer or pusher device for moving the incoming bottles alternately to the action of one and the other of the label-feeding mechanisms; controlling clutch mechanism operated by the incoming bottles for controlling the operation of the machine and whereby its work is made dependent upon the arrival of the bottles at the proper position to be acted upon by the transfer device; and two feed-out conveyers which take the labeled bottles from the respective label-applying mechanisms and deliver them from the machine.

*The machine frame.*—This frame may, in general, be of any suitable character. In the machine shown, it consists generally of three table portions 1, 2 and 3, arranged one above another and supported on the four hollow pipe members 4. Suitable bolts 4ª pass through these pipe members from the supporting feet 4ᵇ to the top table 3, and thus hold the three tables firmly in place.

*The bottle conveyers.*—In the horizontal plane of the central table 2, is a longitudinally extending bottle conveyer 5, for feeding the bottles into the machine, and having the parallel conveyer chains or belts 6. At their outer ends these chains pass over idle sprockets 7 (see Fig. 2) carried by shafts 8, journaled in the side pieces 9. These side pieces are made adjustable, as indicated at 9ª for the purpose of regulating the slack of the chains. At the machine end, the conveyer belts or chains 6 pass over sprocket wheels 11, which are keyed to a shaft 10. The side boards 12 of the conveyer act as side guards for the row of bottles. A row of incoming bottles is indicated at 13. 14 designates a bottle which has just received its label and is about to be conveyed away and 15 indicates bottles which are being carried away by the delivery conveyers. These delivery conveyers are arranged at opposite sides of the longitudinal center of the machine, as clearly shown in Fig. 1, and are similar to the feed-in conveyers. They each consist of two parallel chains or belts 16, which pass over idle sprockets 17, at their outer ends, and are driven at their machine ends by sprocket wheels 18, on the shaft 10, before referred to. The idle wheels 17 are carried by the shafts 17ª, which are journaled in the adjustable brackets 19, for taking up slack in the chains. 20 designates side boards or guards for the delivery conveyers. The shaft 10 which actuates the three conveyers carries a sprocket wheel 21, which is driven by a sprocket chain 22 from a sprocket wheel 23. The sprocket wheel 23 is keyed to a quill shaft 24, which is loosely mounted on a main shaft 25, journaled below the table 2. 26 (see Figs. 3 and 4) designates a main drive wheel which is keyed or otherwise secured to the quill shaft 24. The quill shaft and sprocket wheel 23 being directly connected to the main drive wheel 26, the three conveyers are constantly driven.

Figures 2, 2A:
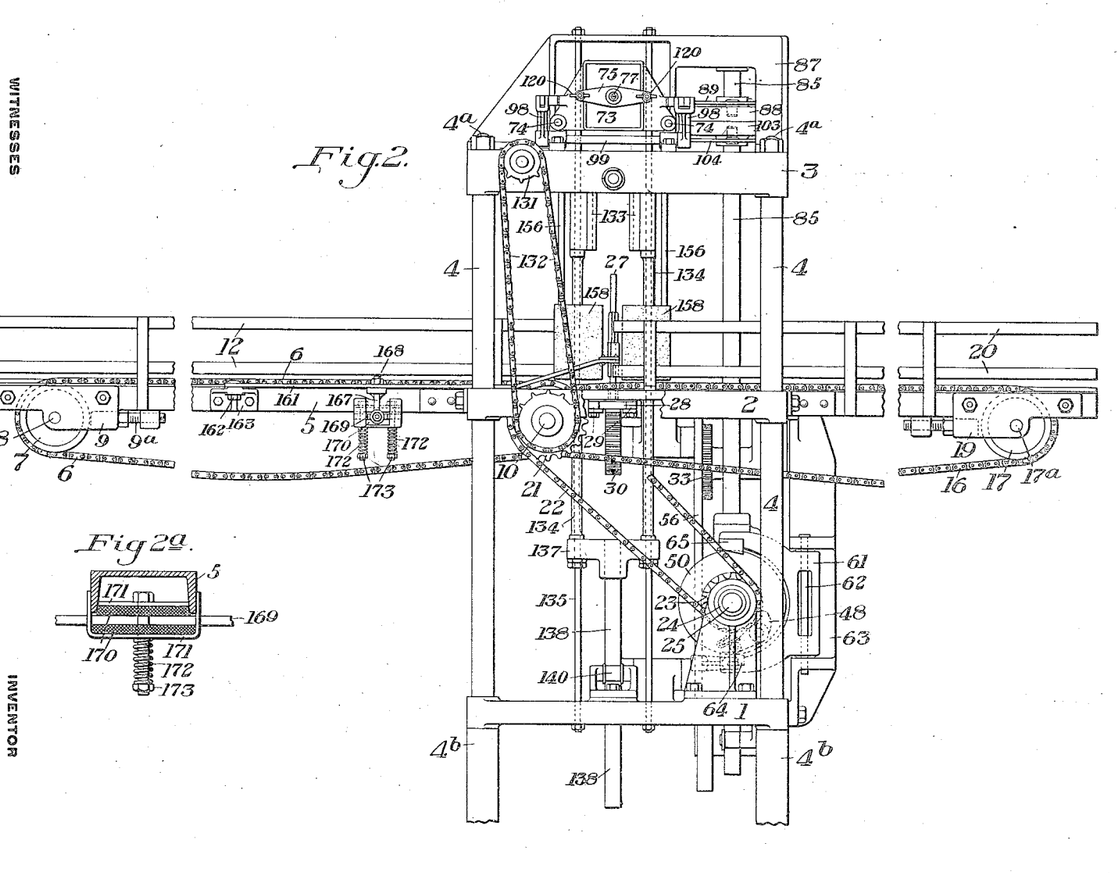
Figure 3:
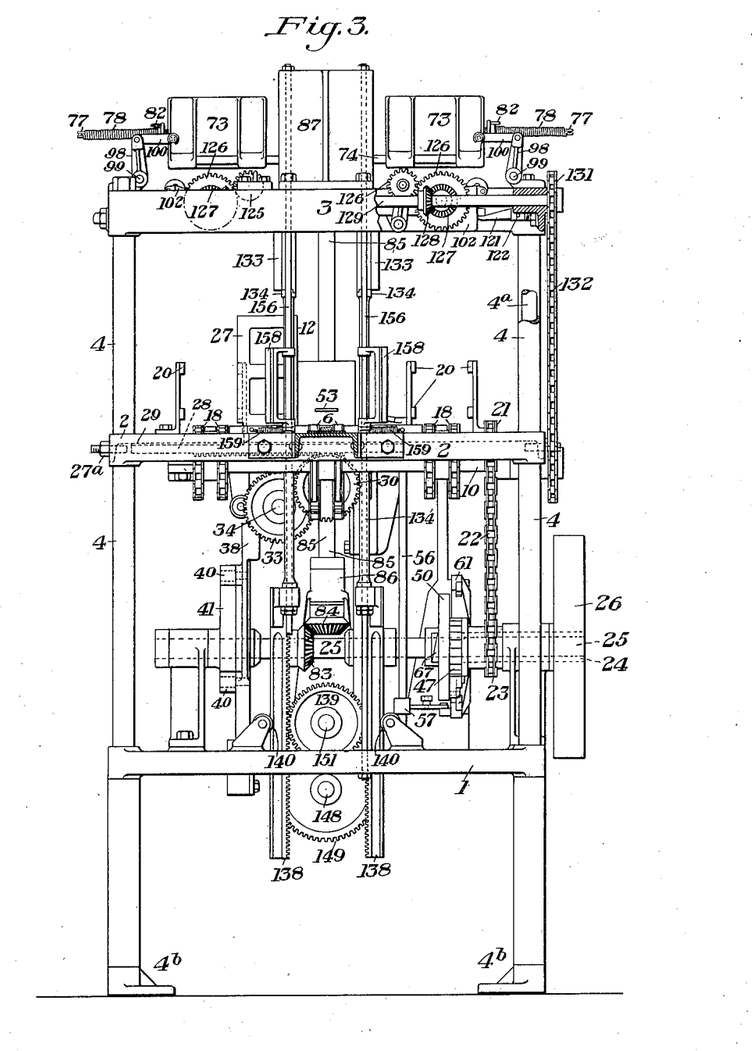
Fig. 3 is a front elevation of certain of the parts in section.
Figures 11, 14:
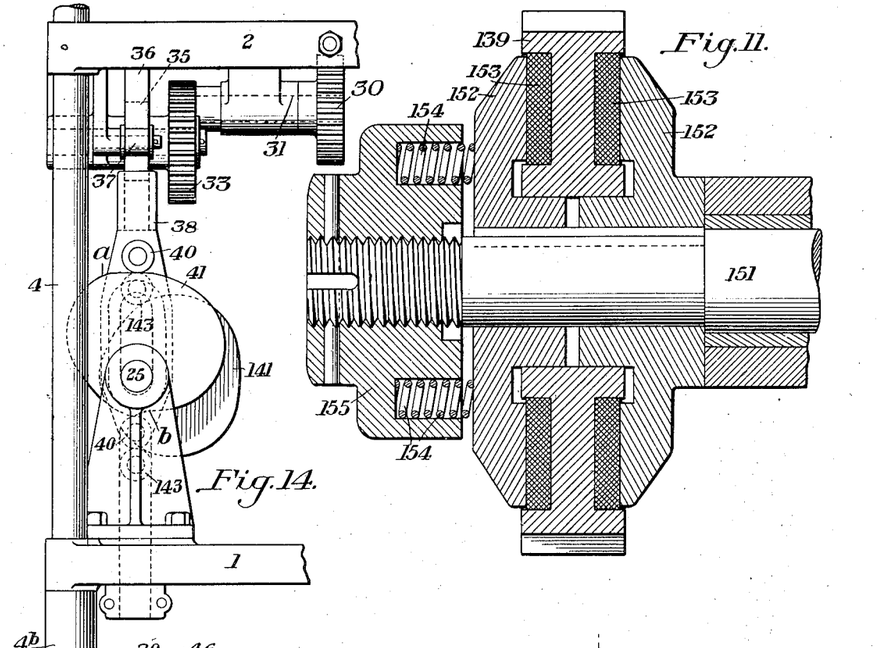
Figs. 11, 12 and 13 are detail views showing slip gears or clutches used in the machine.
Fig. 14 is a detail view showing the actuating cams.
Figure 12:
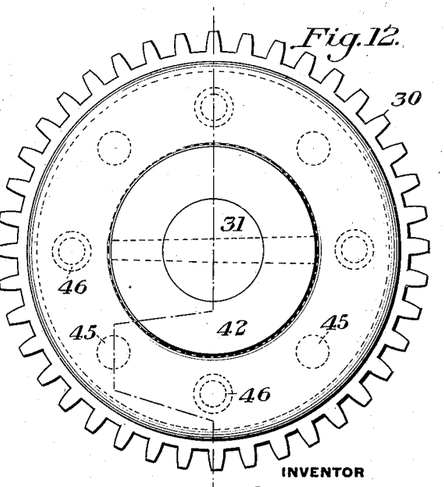
Figure 13:
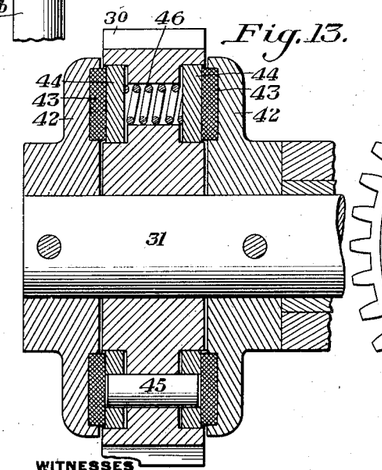

*The bottle pusher or distributer.*—This bottle pusher or distributer consists of a transversely movable vertical plate member 27, which is rigidly secured to or integral with a transverse removable rack bar 28 (see Figs. 2 and 3). This rack bar 28 is mounted in suitable ways or guides 29 on the central table 2. The rack 28 is arranged to be reciprocated by means of a gear wheel 30, whose teeth engage in teeth of the rack. The gear wheel 30 is mounted on a shaft 31, to which it is connected by a friction or a slip device, hereinafter described. Rigidly secured to the shaft 31 is a pinion 32, which is driven by a gear 33, fixed to a shaft 34, which also has secured thereto a pinion 35, whose teeth are engaged by the teeth of a vertically reciprocating rack bar 36, the rack bar being held in engagement with the pinion by means of a roller 37. The rack bar 36 is rigidly connected to a yoke 38, which has a guide bearing 39 at its lower end, its upper end being guided by the roller 37, just referred to. This yoke carries two antifriction rollers 40 (see Figs. 3 and 14) which contact with opposite sides of a cam 41 which is fixed to the main shaft 25. When the shaft 25 is set in motion by the means presently described, the cam 41 will effect a vertical reciprocation of the yoke and its attached rack bar 36, thereby, through the train of gears described, effecting a transverse reciprocation of the rack bar 28 and a corresponding reciprocation of the pusher plate 27. The cam 41 has a high spot or hump *a* and an opposite recess *b* (see Fig. 14) the purpose of which is to cause the pusher plate 27 to make a slightly longer travel than indicated by the rest position on the cam. The pusher plate will consequently drop back a short distance before it comes to rest, for the purpose hereinafter stated. As before stated, the gear wheel 30 has a slip connection with its shaft 31. Any suitable form of slip gear may be employed. In Figs. 12 and 13, I have illustrated one such form. In these figures, the gear wheel 30 is shown as loosely mounted on the shaft 31, between two members 42, which are fixed to the shaft 31. Each of the members 42 carries a friction ring 43, opposite which rings the faces of the wheel 30 are recessed to receive rings 44. These rings are guided on a series of pins 45, and are pressed outwardly by a series of springs 46, interposed between the two rings. When the driving friction between the rings 43 and 44 is overcome, the driving connection between the wheel 30 and the shaft 31 will be destroyed. This permits the machine to perform a one-half cycle of its operation, without causing any damage thereto, as more fully hereinafter described.

Figure 9:
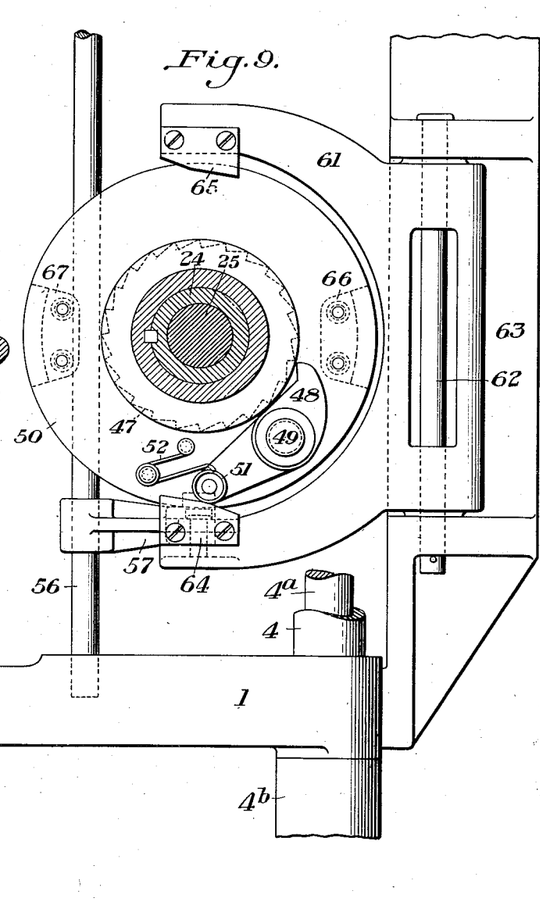
Figs. 9 and 10 are detail views showing portions of the bottle-controlled clutch mechanism.
Figure 10:
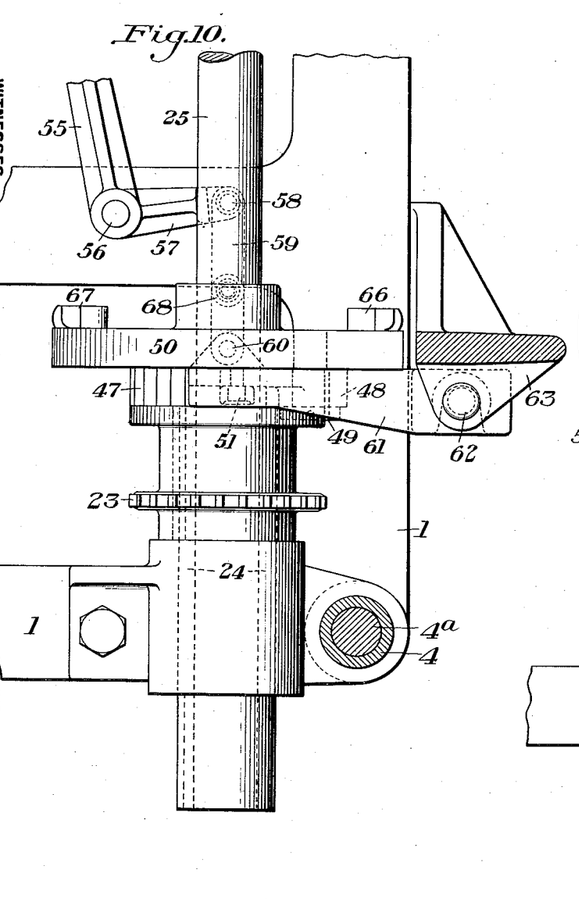

*The controlling or timing mechanism.*— As just described, the pusher mechanism is actuated from the main shaft 25 and the pasting and labeling mechanisms presently to be described are also operated from this shaft 25. The connection between the shaft 25 and the clutch shaft 24 is controlled by a clutch which, in turn, is controlled by the arrival of the bottles at a certain point of their travel. I will now describe this clutch, together with the bottle-actuated mechanism for controlling the same. Fast to the quill shaft 24 is a ratchet wheel 47 (see Figs. 3, 9 and 10). The teeth of this wheel are arranged to be engaged by a pawl or dog 48, pivoted at 49 to a disk 50 which is rigidly secured to the shaft 25. The dog 48 has an arm projecting beyond its pivot 49, and mounted on this projecting arm is a roller 51, which is pressed outwardly by a spring 52, also carried by the disk 50. When the pawl or dog 48 is in engagement with the teeth of the ratchet wheel 47, there is a driving connection between the clutch shaft 24 and the main shaft 25. The numeral 53 (Fig. 1) designates a stop plate, arranged to be engaged by the bottles 13. This plate is hinged at 54 to an arm 55, which is fixed to the upper end portion of a vertical shaft 56. To the lower end portion of this shaft is fixed an arm 57, having a pin 58, at its outer end. To this pin is attached a connecting plate 59, whose opposite end is attached at 60 to a yoke 61. This yoke is hinged by a vertical pin 62 to a bracket 63. The arrangement of this yoke will be best understood by reference to Figs. 2, 9 and 10. The arms of the yoke at their upper ends carry, respectively, the inwardly projecting plates 64 and 65 which are adjacent to one face of the disk 50, before referred to. On the opposite side of this disk are two cam plates 66 and 67, which are adapted to engage with a roller 68, on the connecting plate 59, when the latter is moved toward the drive wheel side of the machine from the position shown in Fig. 10. As shown in Fig. 9, one of the plates 64 or 65 when the parts are in the position shown in Fig. 1, will contact with the roller 51 of the dog 48, and thereby hold said dog out of engagement with the teeth of the ratchet wheel 47. When a bottle contacts with the plate 53, it pushes said plate forwardly, thereby rocking the vertical shaft 56, and through the connections before described, moves the yoke 61 so that the plate 64 will disengage the roller 51 and allow the dog 48 to engage with the teeth of the ratchet wheel 47. The shaft 25 is now set in motion. If every bottle arrives in a position to trip the plate 53 at exactly the right time, that is, before the dog 48 is disengaged from the ratchet 47, there will be a continuous operation of the shaft 25 and of the parts operated thereby; but if a bottle does not arrive at the tripping point at the proper time, the inclined members 66 and 67 on the rear side of the disk 50 will engage the roller 68, on the connecting plate 59, and will move the yoke 61 into a position so that one of the plates 64, 65, will contact with the roller 51 and throw the dog 48 out of engagement with the ratchet wheel 47. The machine will therefore stop until such time as a bottle arrives in position to again trip the plate 53. The numeral 69 designates a lever arm pivoted to the table 2 at 70, and connected at 71 to an operating rod 72. The rod 72 can be moved to throw the lever 69 to a position such that its free end will form a lock for the arm 55 and prevent the bottles from moving the plate 53 and thereby starting the operation of the machine.

Figure 4:
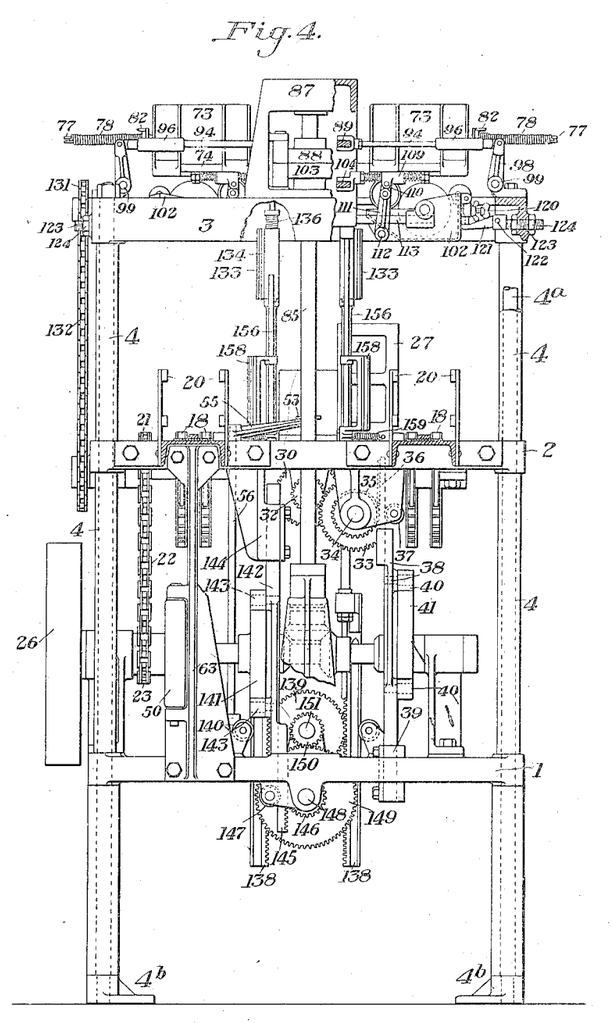
Fig. 4 is a rear elevation also having certain of the parts in section.
Figure 5:
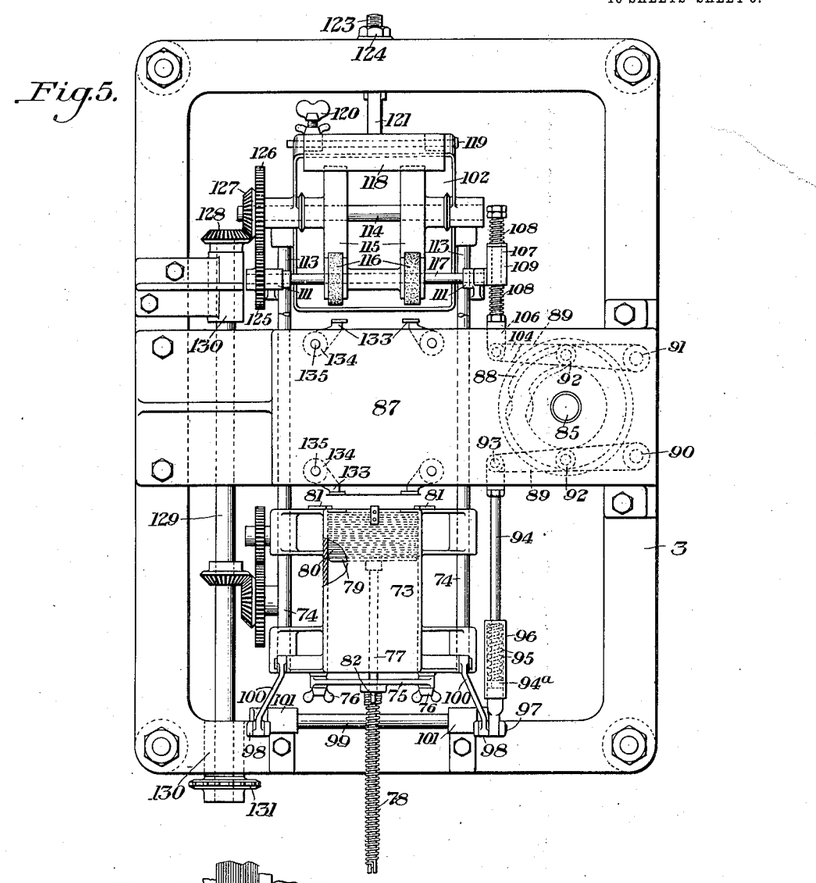
Fig. 5 is a plan view of the upper portion of the machine with one of the label holders removed.
Figure 6:
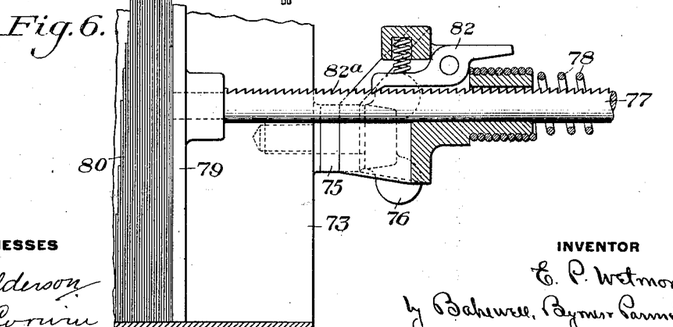
Fig. 6 is a detail view partly in plan and partly in horizontal section of a portion of one of the label-feeding mechanisms.
Figure 7:
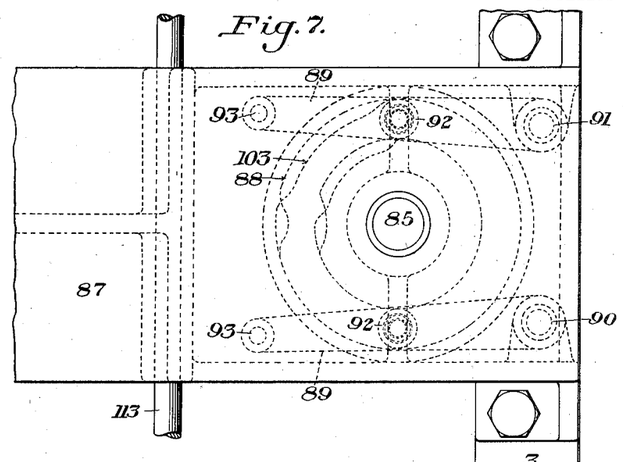
Figs. 7 and 8 are detail views showing in plan and side elevation, respectively, portions of the operating mechanism for the pasting and label-feeding mechanisms.
Figure 8:
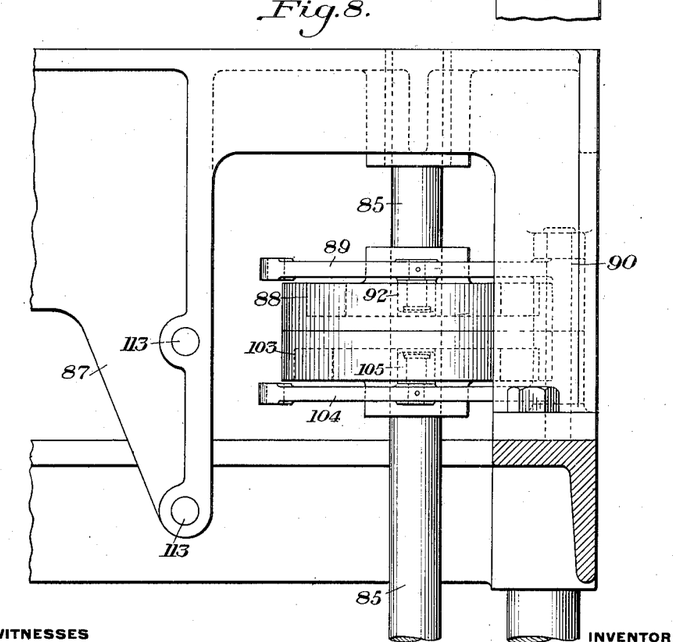

*The label holders and their operating mechanism.*—As before stated, there are two complete sets of label-applying mechanisms. The labels are placed in the label holders 73, one of these holders being arranged above the upper table 3, at each side of the longitudinal center of the machine, in the manner best shown in Figs. 3 and 4. They are mounted to slide toward and from the center of the machine upon the guide rods 74. At the outer end of each of the label boxes is a cross piece 75, secured thereto by thumb screws 76. Passing through this cross piece is a rod 77 (see Figs. 5 and 6) the outer end of which is pressed inwardly by a spring 78, the inner end of the spring seating against the cross piece 75. The inner end of the rod 77 carries a pusher plate 79, which pushes against the pack of labels 80 within the box, and serves to keep them in contact with the tips of the members 81, at the inner ends of said box, said tips serving to normally prevent the labels from being pressed out of the box by the action of the spring 78. Backward movement of the pusher plate is prevented by the spring-pressed dog 82, engaging ratchet teeth 82ª formed in the rod 77. The label boxes are reciprocated on the guides 74 by the following mechanism: Secured to the shaft 25 is a bevel gear wheel 83 (see Fig. 3) which drives a similar gear 84, fixed to the lower end portion of a vertical shaft 85, which is journaled at its lower end portion in a bracket 86, supported by the lower table 1. The upper end portion of this shaft is carried in a bearing in a casting 87, secured to the upper table 3. Secured to the upper end portion of the shaft 85 is an internal or grooved cam 88 (see Figs. 5 7 and 8). 89 designates two arms which are respectively hinged at the points 90 and 91, and which carry intermediate of their ends antifriction rollers 92, engaging opposite side portions of the cam groove of the cam 88. The free ends of the arms 89 are connected by means of pins 93 to connecting rods 94. The outer end of each rod has a collar 94ª, which forms a seat for one end of a spring 95, said spring being seated within a cylindrical sleeve member 96, into which the end of the rod telescopes (see Fig. 5). The outer end of each member 96 is connected by a pin 97 with an arm 98 of a rock shaft 99, the arms 98 being connected with the label boxes 73 by the links 100. The rock shaft 99 is journaled in bearings 101 (see Fig. 5) and has one of the arms 98 at each end, the two arms being connected to opposite sides of the outer end of the label box. The actuating connections for only one of the label boxes is shown in Fig. 5, but it will be understood that there are similar connections for each of the boxes, as indicated in Figs. 3 and 4. The revolution of the cam 88 actuates the arms 89 and the connections, just described, to move the label boxes alternately toward and away from the longitudinal center of the machine.

*The paste applying mechanisms.*—The paste is contained in two receptacles 102, one of which is placed at each side of the machine, underneath each of the label holders. On the vertical shaft 85, before described, and just below the cam 88, is a second internal grooved cam 103 (see Figs. 5, 7 and 8). Pivoted on the vertical rods 90 and 91, before referred to, are two arms 104 (similar to the arms 89, above described) and which carry rollers 105 at their central portions which engage opposite portions of the cam groove of cam 103. To the free end of each arm 104 is attached a connecting rod 106. Screwed into this connecting rod is a small shaft 107, carrying two springs 108, which are so arranged as to keep the rod centrally within a sleeve member 109. The member 109 (see Fig. 4) is connected at 110 to an arm 111, of a rock shaft 112, said shaft having bearings below one end portion of the adjacent paste receptacle. The latter is supported by means of two horizontal rods 113, which are carried by the casting 87. 114 designates a shaft which is journaled in the sides of the paste receptacle and which extends transversely thereof. Secured to this shaft are two rollers 115, which turn within the paste receptacle and serve to pick up the paste or glue and distribute it to rubber-covered rollers 116. These rollers 116 are secured to shaft 117, which is carried by the arms 111 of the shaft 112, before referred to. 118 designates a wiper which is hinged to a pin or shaft 119, and which serves to remove the excess paste or glue from the surfaces of the rollers 115. The pressure of this wiper is regulated by any suitable means, such as a thumb screw 120. 121 designates a latch device hinged at 122 to the bolt 123, the latter being fastened to the table 3 by the nuts 124. This latch and bolt, together with the nuts 124, serves to regulate the position of the paste pot relative to the pickers, hereinafter described, when the latter are in their highest positions, and also permit easy removal of the paste receptacle for cleaning. Secured to the end of the shaft 117 is a pinion 125, which meshes with the gear wheel 126 on the shaft 114. The shaft 114 also has fixed thereto a bevel gear 127, which meshes with a corresponding wheel 128 on a shaft 129, supported in the bearings 130. The shaft 129 carries a sprocket wheel 131, driven by a sprocket chain 132 (see Figs. 3 and 4) from the shaft 10. The gear connections just described cause a constant rotation of the wheels 115 within the paste receptacles, and the action of the cam 103 is such as to periodically move the wheels 116 toward and away from the peripheries of the wheels 115. When the wheels 116 are in contact with the wheels 115, the pinions 125 are in driving engagement with the gears 126, so that the wheels 116 are then rotated. While in contact with the wheels 115, they receive their coating of paste or glue, and when moved forwardly by the action of the cam 103, they move in contact with and apply the paste or glue to the surfaces of certain picker devices next to be described, and which are provided for the purpose of selecting one label at a time from the label receptacles and carrying them into position to be applied to a bottle. It will be understood that the arm 104 at one side of the cam 103 operates the pasting mechanism at one side of the machine, while the arm 104 at the opposite side of said cam operates the pasting mechanism at the opposite side. The shaft 129 is common to both pasting mechanisms, as will be clearly seen by reference to Fig. 5.

Figure 1:
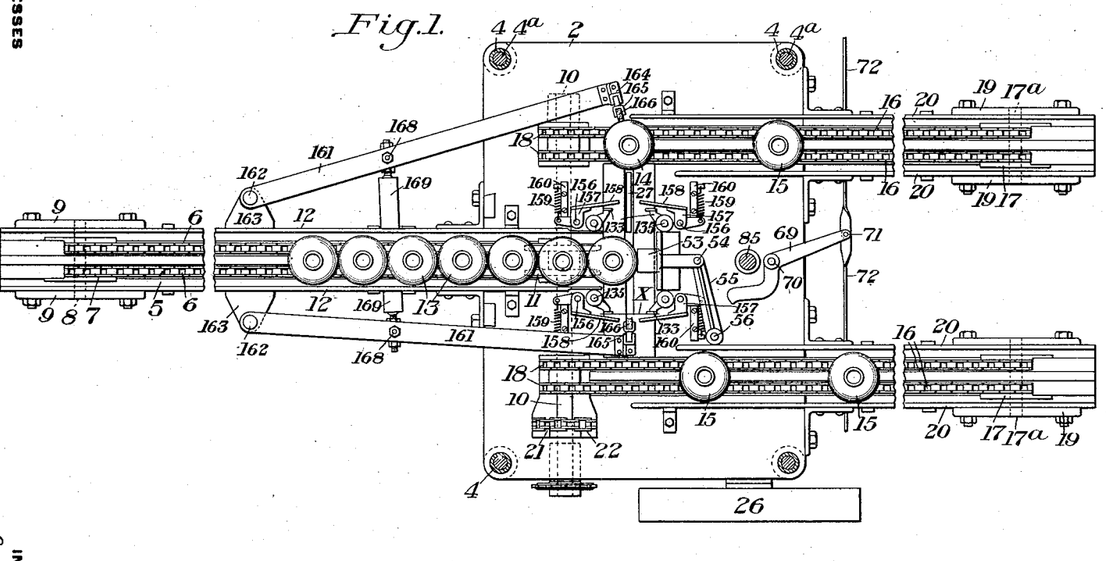
Figure 1 is a horizontal section of a machine embodying my invention, the section being taken above the central table of the machine.

*The means for transferring and applying labels.*—Upon each forward movement of each label receptacle, the foremost label therein is pressed into engagement with picker devices which have previously received a coating of paste or glue in the manner just described, causing the label to adhere thereto. These pickers are then moved downwardly to carry the label into a position across the transverse line of movement of a bottle, as it is moved by the pusher plate 27. These pickers are arranged in two pairs, one pair at each side of the machine, and are designated by the numeral 133. The general arrangement of these pickers will best be understood by reference to Figs. 1 and 5. The pickers are carried by the upper end portions of four hollow rods or shafts 134, which are arranged to reciprocate on the vertical guide rods 135, passing therethrough, these rods extending from the table 2 upwardly to the top casting 87, in which they are secured. The pickers are mounted to have a limited rotary movement about the axis of the hollow shafts 134, being attached thereto through the medium of torsion springs 136, as best shown in Fig. 4. These springs tend to keep the pickers in the position shown in Fig. 1, but permit them to move sufficiently to permit full-sized bottles to pass between the pairs of pickers under the action of the pusher 27. The tubular rods or shafts 134 are secured at their lower ends to cross beams 137 (as best shown in Fig. 2). Each of these cross beams 137 is connected to the upper end portion of a vertically movable rack bar 138, these rack bars having their teeth held in engagement with opposite sides of a toothed wheel 139, by means of rollers 140 (see Figs. 3 and 4). The gear wheel 139 is actuated as follows: On the main shaft 25 is fixed a cam 141 (see Figs. 4 and 14). This cam is embraced by a yoke 142, carrying antifriction rollers 143, which engage opposite sides of the cam surface. The upper end portion of the yoke slides in a guide bearing 144, (see Fig. 4). Its lower end portion is formed with a toothed rack 145, which is held in engagement with the teeth of a pinion 146, by a roller 147. The pinion 146 is fastened to a shaft 148, which also carries a spur gear wheel 149. The gear wheel 149 meshes with a pinion 150, which is on the same shaft 151 with the pinion 139, before referred to. The pinion 139 is connected with the shaft 151 through a slip or friction device of any suitable character, such as that shown in detail in Fig. 11. The connection, as shown in this figure, consists of the disks 152 at opposite sides of the gear 139, with interposed fiber or friction plates 153, the parts being norinally clamped in frictional driving contact by means of a series of springs 154, secured by an adjusting nut 155. In case of any obstruction, due to a broken bottle or imperfect setting, the machine will not be injured, but the gear 139 will slip relatively to the shaft 151 and on the next one-half cycle will re-set itself by the contact of the upper ends of the rack bars 138 with the under side of the table 2. Inasmuch as the pickers are reciprocated from the main shaft 25, their action is controlled by the clutch mechanism before described, being dependent upon the action of a bottle upon the trip plate 53. The numeral 156 designates four vertical rods which extend from the table 2 to the casting 87 of the upper table 3, one of these rods being adjacent to each of the picker shafts 134 (see Fig. 1). These rods 156 act as vertical shafts for bracket arms 157, secured thereto, and having at their outer sides rubber wipers 158. These wipers, as clearly shown in Fig. 1, lie just outside of the pickers 133, and in the paths of the bottles as they are moved to either side by the pusher plate 27. Their purpose is to rub the labels upon the bottle. The brackets 157 have tail extensions to which are attached tension springs 159. These tail extensions are limited in their movements by the stop blocks 160. The numeral 161 (see Fig. 1) designates two arms which are pivoted at 162 to bracket extensions 163 of the conveyer 5. These arms extend forwardly over the table 2, their free ends terminating at points which are in the line of transverse movement of the bottles under the action of the pusher 27. The free end of each arm is provided with a jaw member 164, in which is hinged a holder 165 for a rubber tip 166. These tips are adapted to bear against the labels and hold them upon the bottles while the bottles are pulling the labels from the pickers 133. The two arms 161 are connected by a tension device by means of which any desired pressure of the tips 166 upon the bottles and labels can be obtained. The tension device is shown in Figs. 1, 2 and 2$^a$. It consists of two brackets 167, swiveled at their upper ends at 168 in the respective arms 161, and receiving therein the round ends of a flat bar 169, which, with the brackets, forms a connection for the arms 161. This bar 169 passes below the conveyer 5 and between two fiber plates 170, which are held compressed against the central portion of the bar by the plates 171. Springs 172 and nuts 173 serve to regulate the friction of the fiber plates against the sides of the bar (see Fig. 2$^a$).

By reference to Fig. 1, it will be understood that, as each bottle is forced between a pair of the pickers 133 and of the rubbers 158, it is moved into contact with one of the rubber tips 166 and that the corresponding arm 161 is moved outwardly against the friction imparted to the connecting member 169 in the brackets 167. As one arm 161 is moved outwardly to the position shown at the upper side of Fig. 1, the other arm is moved inwardly to the position shown at the lower side of Fig. 1 and in position to contact with the next bottle 13, which will be moved by the pusher in that direction.

*The operation of the machine.*—The operation of the machine will be clearly understood from the detailed description heretofore given. It may, however, be summarized as follows: The bottles are either placed upon the conveyer 5 by hand or they are delivered thereto in any suitable manner. This conveyer runs a little faster than the speed necessary to simply carry independent bottles to the machine. The bottles will consequently slide somewhat upon the central fixed portion of the conveyer and this sliding causes the advanced bottles to press against the trip plates 53. Fig. 1 illustrates the position occupied by the parts when one bottle 14 has just received its label and has been released and is ready to be taken off by the conveyer 16 at that side. The advance bottle 13, pressing against the trip 53, trips the dog or pawl 48 in the manner before described and permits it to engage the ratchet wheel 47. This starts the shaft 25 in motion. The pusher 27 now pushes the advance bottle 13 toward the lower side of Fig. 1 and against the label X, which is carried on the pickers 133 at that side, and which stands across the path of movement of the bottle. As the bottle is forced against this label, the bottle and label are pushed against the rubber tip piece 166, and the bottle passes between the pickers and between the rubber wipers 158. This applies the label to the bottle. Owing to the hump $a$ and recess $b$ on the cam 41, the pusher 27 makes a slightly longer travel than indicated by the long or rest position on the cam, and consequently, the pusher plate will move back a short distance before coming to rest. This releases the bottle between the pusher plate 27 and the rubber tips 166 and leaves the bottle free to be carried away by the conveyer 16, without causing any friction of a nature to injure or move the freshly pasted label on the bottle. The arm 161 at this time occupies a position (as will be readily seen by reference to the upper side of Fig. 1) which will not interfere with the movement of the bottle on to the conveyer. If the bottles arrive at the trip plate 53 in just the right sequence, there will be no disengagement of the dog 48 from the ratchet 47, and the machine will operate continuously. In the event, however, of the failure of a bottle to arrive at this point at just the proper time, the devices shown in detail in Fig. 9 and before described will operate to disengage the dog 48, and the parts operated by the shaft 25 will remain idle until such time as a bottle arrives in position to again trip the plate 53. The work of the machine is thus made entirely dependent upon the arrival of the bottles in proper position to act upon the trip plate 53. In the position of the parts shown in Fig. 1, the pickers 133 are at the center of their throw vertically. As soon as the machine is thrown into gear by a bottle, one set of these pickers will rise through the action of the cam 141, and before they arrive at their upper limit of movement, the paste rollers 116 will move forwardly to distribute the paste to the pickers. At the time the pickers arrive at their top position and are in a state of rest, due to the shape of the cam 141, the corresponding label box moves forward to press the outermost label in contact with the glue or paste on the picker plates, and then immediately moves backward while the picker plates are still at rest. In this manner, one label at a time is removed from the label box, and is left upon the picker plates. The picker plates then descend to their central position, and in case the bottle properly arrives to its tripping position, the pickers come to rest at their lowest position and the pusher plate then pushes the bottle against the label in the manner before described. The picker plate will then return to its central position vertically and will remain there in case no bottle has arrived to cause the machine to further operate.

It will be understood from the foregoing description of the picker-actuating mechanism that one pair of pickers moved upwardly as the other pair moves downwardly. It will also be understood that the arrangement of the cams 88 and 103 is such as to cause reverse operations of the two label boxes and paste-applying mechanisms. In case a bottle falls over or any other obstruction is encountered by the pusher plate 27, the friction device shown in Figs. 12 and 13 allows the gear 30 to slip so that the machine can perform one-half cycle of its operation without any damage to the machine. The machine will then stop until the lever arm 69 is moved backward by hand to trip the driving clutch, when a further one-half cycle will re-set the pusher plate in its correct relative position. This re-setting is effected by causing the ends of rack to which the pusher plate is attached to engage stop bolts 27ª at each side of the machine (see Fig. 3).

Figure 15:
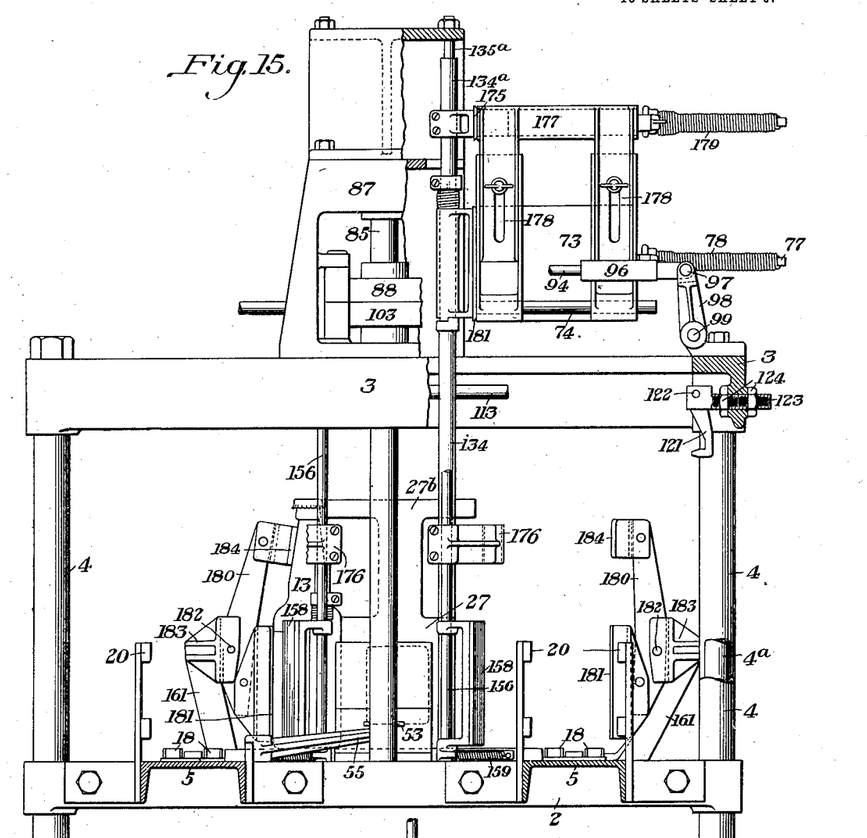
Fig. 15 is a side elevation partly in section, illustrating a modification of the machine arranged to apply a neck label as well as a body label.
Figure 16:
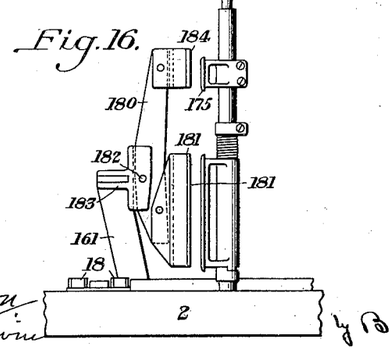
Fig. 16 is a detail view of a portion of Fig. 15.
Figure 17:
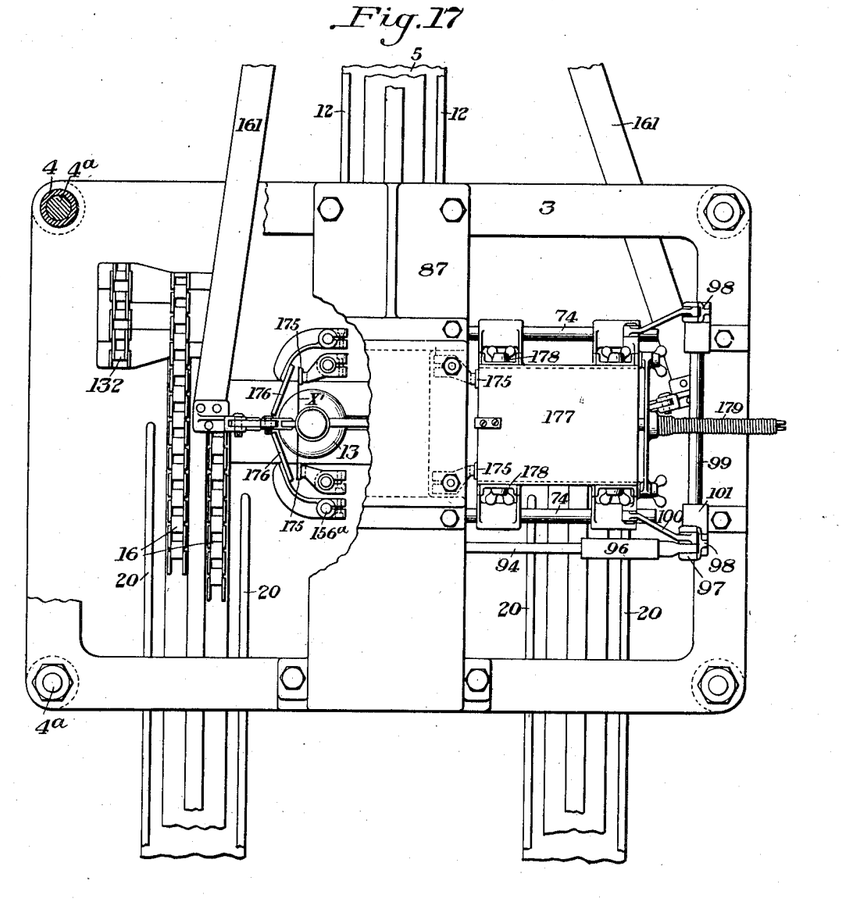
Fig. 17 is a plan view of the arrangement shown in Fig. 15.

It is sometimes desired, in addition to the body label to place a smaller label upon a neck portion of a bottle. My machine can be readily adapted for the simultaneous application of both a body and a neck label. In Figs. 15, 16 and 17, I have shown a modification suitable for this work.

The machine is in general the same as that before described, and in these three figures, the parts of the machine which are unmodified are given the same reference numerals as in the preceding figures.

The four hollow shafts 134 are made longer than in the machine first described, their upward extensions being indicated in Figs. 15, 16 and 17 at 134ª. The guide rods 135 are also provided with the upward extensions 135ª. To the extensions 134ª are rigidly secured the pickers 175, which are similar to the pickers 133. As stated, they are rigidly secured to the hollow shaft extensions, not being required to move, as the diameter of the neck of the bottle is much less than the diameter of the body portion. The vertical rods 156 carry the wipers 176, which are generally similar to the wipers 158. The wipers 176 are for the purpose of wiping the neck labels upon the bottles.

Above each label box and secured thereto to move therewith is an additional and similar label box 177. These boxes 177 are adjustably mounted with respect to the main label box 73, as indicated at 178, so that the height of the neck labels can be adjusted with respect to the bottles. Inside of each of these auxiliary label boxes is a pusher device in all respects similar to that first described and shown in detail in Fig. 6, the pusher plates being provided with the springs 179.

The faces of the picker plates 175 are in the same vertical plane as the faces of the respectively corresponding picker plates 133. Consequently, when the pickers for both the body and the neck labels pass the paste or glue rollers 116, the latter distribute paste or glue upon the neck label pickers as well as upon the body label pickers.

When either body label box, which also carries a neck label box, approaches the center of the machine, both the body and the neck labels in the two boxes contact with the body and neck pickers at the same time, and the pickers thus pick one label from each box. One of these neck labels is shown at X' in Fig. 17. The body label is held against the bottle in the same manner as that previously described, namely, by a rubber or similar tip carried by one of the arms 161. The holder 180 for this tip 181 is, however, somewhat different from that first described, in that it consists of a lever arm pivoted at 182 in a jaw 183, at the end of the arm 161. The tip 181 is secured to one arm of the lever 180, and secured to its other arm is a tip 184. One tip 184 is opposite to the neck label pickers 175 (see Fig. 16). When a bottle is moved against the lower tip 181, it causes the lever 180 to rock on its pivot and move the tip 184 toward the bottle to engage its neck in the manner shown in Fig. 15. From this time, all the parts carried at the end of the arm 161 move with the bottle, while the same is passing through the wipers. The operation of releasing the bottle after the labels have been applied is precisely the same as before described. The lever 180 is normally in vertical position, as shown in Fig. 16, so that the two rubbers 181 and 184 are normally in vertical line until such time as the lower rubber contacts with a bottle. In the case of bottles of unusual height, I provide the pusher plate 27 with an extension 27$^b$ (see Fig. 15). This extension is adapted to contact with the top of the bottle, in order to prevent the bottle being tipped while passing through the wipers. By the simple addition of these parts, the machine can be made to simultaneously apply both neck and body labels to bottles.

The advantages of my invention will be apparent from the foregoing. The machine is comparatively simple with respect to the numerous operations which it automatically performs; it is capable of doing work rapidly and efficiently; and, owing to the provision of the safety devices described, the danger of breakage due to obstructions is reduced to a minimum.

I do not desire to limit myself to the particular construction and arrangement of the parts which I have herein shown and described, since it is obvious that in detail the machine can be widely changed, without departing from the spirit and scope of the invention as defined in the appended claims. Thus, in matters of frame construction; in the nature and arrangement of the gearing and actuating connections, and in various other respects, wide variations may be made, without affecting the principle of the machine.

I claim:

1. A labeling machine, comprising a feed-in mechanism, an article-transfer device for moving the articles laterally from the delivery of the feed-in mechanism to a labeling station, a label-applying mechanism, a trip device for contact with the articles, and connections operated by the trip device for controlling the time of operation of the transfer device, substantially as described.

2. A labeling machine, comprising a feed-in mechanism, an article transfer device, a label-applying mechanism, a trip device arranged for contact with the article, and connections operated by the trip device for controlling the time of operation of the transfer device and of the label-applying mechanism, substantially as described.

3. A label-applying machine, comprising a feed-in conveyer, a trip device arranged to be operated by the articles to be labeled at a certain point in their feed-in movement, a label-applying mechanism, a transfer device for carrying the articles to the action of the labeling mechanism, and connections controlled by the trip device for controlling the time of operation of the transfer device substantially as described.

4. A machine for applying labels, comprising a feed-in conveyer and two feed-out conveyers, two sets of label-applying mechanisms, and a distributing device for distributing the articles to be labeled alternately to the two label-applying mechanisms and thence to the respective feed-out conveyers, substantially as described.

5. A label-applying machine, comprising a centrally arranged feed-in conveyer and two feed-out conveyers arranged at opposite sides of the line of action of the feed-in conveyer, two sets of label-applying mechanisms, and a distributing device for moving successive bottles alternately to the action of one or the other of the label-applying mechanisms, substantially as described.

6. A label-applying machine, comprising a centrally arranged feed-in conveyer and two feed-out conveyers arranged at opposite sides of the line of action of the feed-in conveyer, two sets of label-applying mechanisms, and a distributing device for moving successive bottles alternately to the action of one or the other of the label-applying mechanisms, together with an article-actuated tripping mechanism for controlling the time of action of the distributing device and of the label-applying mechanisms, substantially as described.

7. A label-applying machine, comprising a feed-in conveyer, two feed-out conveyers arranged at opposite sides of the line of action of the feed-in conveyer, a transversely movable distributing device, and means controlled by the articles to be labeled for timing the action of the distributing device, substantially as described.

8. A label-applying machine, comprising a feed-in conveyer, two feed-out conveyers arranged at opposite sides of the line of action of the feed-in conveyer, a transversely movable distributing device for the articles to be labeled, gearing for actuating said device, a trip member arranged for successive contact with the articles, and connections actuated by the trip device for controlling said gearing, substantially as described.

9. A label-applying machine, comprising a feed-in conveyer, a feed-out conveyer arranged at one side of the line of action of the feed-in conveyer, label-applying mechanism arranged intermediate the two conveyers, a transversely movable pusher device for moving the articles to be labeled from the delivery end of the feed-in conveyer through the label-applying mechanism to the feed-out conveyer and means controlled by the articles to be labeled for controlling the time of operation of the pusher device, substantially as described.

10. A label-applying machine, comprising a feed-in conveyer, a feed-out conveyer arranged at one side of the line of action of the feed-in conveyer, label-applying mechanism arranged intermediate the two conveyers, and a transversely movable pusher device for moving the articles to be labeled from the delivery end of the feed-in conveyer through the label-applying mechanism to the feed-out conveyer, together with actuating mechanism for the pusher device, a trip member arranged to be engaged by the bottles at the delivery end of the feed-in conveyer, and connections operated by the trip device for controlling the action of the pusher device, substantially as described.

11. A label-applying machine, comprising a feed-in conveyer, a feed-out conveyer arranged at one side of the line of action of the feed-in conveyer, label-applying mechanism arranged intermediate the two conveyers, and a transversely movable pusher device for moving the articles to be labeled from the delivery end of the feed-in conveyer through the label-applying mechanism to the feed-out conveyer, together with actuating mechanism for the pusher device, a trip member arranged to be engaged by the articles at the delivery end of the feed-in conveyer, connections operated by the trip device for controlling the action of the pusher device, and other connections operated by the trip member for controlling the action of the label-applying mechanism, substantially as described.

12. A label-applying machine comprising a feed-in conveyer, two feed-out conveyers extending substantially parallel to the feed-in conveyer at opposite sides of the line of action thereof, a transversely movable pusher for conveying alternate articles from the delivery of the feed-in conveyer to one and the other of the feed-out conveyers, a label-applying mechanism intermediate the delivery end of the feed-in conveyer and each feed-out conveyer, and means controlled by the articles to be labeled for controlling the action of the transfer device and of the label-applying mechanism, substantially as described.

13. A label-applying machine, comprising a feed-in conveyer and two feed-out conveyers, the feed-out conveyers being substantially parallel with but arranged at opposite sides of the line of action of the feed-in conveyer, a transversely movable transfer device, a label-applying mechanism intermediate the delivery end of the feed-in conveyer and each feed-out conveyer, and gearing for reciprocating said device in timed relation to the arrival of the articles to be labeled at the delivery end of the feed-in conveyer, substantially as described.

14. A label-applying machine, comprising a feed-in conveyer, a feed-out conveyer, a label-applying mechanism intermediate the adjacent portions of the two conveyers, a transfer device for moving the articles from the delivery end of the feed-in conveyer through the label-applying mechanism to the receiving end of the feed-out conveyer, a movable trip member adjacent the end of the feed-in conveyer, and connections operated by the trip member for controlling the time of action of the transfer and label-applying mechanisms, substantially as described.

15. A label-applying machine having label-applying mechanism, a transversely movable article-moving device for moving the articles to and through the label-applying mechanism, a shaft, actuating connections between the shaft and said device, a driving member for said shaft, a clutch connection between the driving member and the shaft, a trip member adapted to be engaged by the articles to be delivered, and connections actuated by the trip member for controlling the said clutch, substantially as described.

16. A label-applying mechanism, comprising a feed-in conveyer, a separate feed-out conveyer whose receiving end is at one side of the delivery end of the feed-in conveyer, label-applying and pasting mechanisms located intermediately of the two conveyers, a transversely movable transfer device for moving the bottles from the feed-in conveyer through the label-applying mechanism to the feed-out conveyer, and trip devices and connections controlled by the articles to be labeled for controlling the time of operation of the transfer device and of the label-applying mechanisms, substantially as described.

17. A label-applying machine, comprising a feed-in conveyer, a feed-out conveyer operating in a path substantially parallel with but to one side of the feed-in conveyer, gearing for continuously moving the conveyers, a label-pasting and applying mechanism intermediate the feed-in and feed-out conveyers, means for moving the articles to be labeled from the delivery end of the feed-in conveyer through the label-applying mechanism to the feed-out conveyer, a power shaft having actuating connections for operating the label-pasting and applying mechanisms and the article-moving means, a clutch device for controlling the operation of said shaft, a trip arranged to be engaged by the articles, and connections operated by the trip device for controlling the operation of the clutch, substantially as described.

18. A label-applying machine, comprising a feed-in conveyer, two feed-out conveyers having their receiving ends at opposite sides of the delivery point of the feed-in conveyer, a pair of label pickers between such delivery point and the receiving end of each feed-out conveyer, means for supplying labels to said pickers, and means for moving successive articles alternately between one and the other pair of label pickers, substantially as described.

19. A label-applying machine, comprising a feed-in conveyer, two feed-out conveyers having their receiving ends at opposite sides of the delivery point of the feed-in conveyer, a pair of label pickers between such delivery point and the receiving end of each feed-out conveyer, means for supplying labels to said pickers, and means for moving successive articles alternately between one and the other pair of label pickers, together with means for holding the label on the article as the label is removed from the pickers, substantially as described.

20. A label-applying machine, comprising a feed-in conveyer, a feed-out conveyer having its receiving end to one side of the delivery point of the feed-in conveyer, a pair of label pickers located between the adjacent ends of the two conveyers and in the path of movement from one conveyer to the other of the articles to be labeled, means for moving the articles between the label pickers and against the labels held thereby, means for supplying labels to said pickers, and an adjustable pressure device for holding the labels on the articles as the labels are removed by the articles from the pickers, substantially as described.

21. A label-applying machine, comprising a feed-in conveyer, two feed-out conveyers having their receiving ends at opposite sides of the delivery point of the feed-in conveyer, label-holding devices intermediate the delivery point of the feed-in conveyer and the receiving end of each of the feed-out conveyers, means for moving the articles to be labeled past the label-holding devices to the feed-out conveyers, and a pair of connected presser arms arranged to hold the labels on the articles, one of said arms operating in connection with each of said label holding devices, substantially as described.

22. A label-applying machine, comprising a feed-in conveyer, two feed-out conveyers having their receiving ends at opposite sides of the delivery point of the feed-in conveyer, label-holding devices intermediate the delivery point of the feed-in conveyer and the receiving end of each of the feed-out conveyers, means for moving the articles to be labeled past the label-holding devices to the feed-out conveyers, and a pair of connected presser arms arranged to hold the labels on the articles, one of said arms operating in connection with each of said label-holding devices, together with means for regulating the pressure exerted by said arms, substantially as described.

23. A label-applying machine having a feed-in conveyer, a label-applying mechanism at each side of the delivery end of the feed-in conveyer, a transfer device for moving the articles to be labeled alternately to one and the other of the label-applying mechanisms, and gearing for actuating said device, said gearing having a slip element, substantially as described.

24. A label-applying machine having vertically reciprocating label pickers, cam means for actuating the pickers arranged to hold them periodically in a position of rest in both their label-receiving and their label-transferring positions, means for applying adhesive thereto, means for feeding labels to the pickers, and actuating gearing, said gearing comprising a slip element, substantially as described.

25. A label-applying machine, comprising a feed-in mechanism, a pair of vertically movable label pickers at each side of the delivery end of the feed-in mechanism, means for supplying labels to said label pickers, and means for alternately moving successive articles to be labeled between one and the other pair of label pickers, substantially as described.

26. A label-applying machine, comprising a feed-in mechanism, a pair of vertically movable label pickers at each side of the delivery end of the feed-in mechanism, means for supplying labels to said label pickers, and means for alternately moving successive articles to be labeled between one and the other pair of said label pickers, together with a trip device adjacent to said delivery point, and actuating connections operated by said device for controlling the movement of the label pickers, substantially as described.

27. A label-applying machine, having a feed-in conveyer for feeding in the articles to be labeled in a single row, a tripping mechanism arranged to be automatically tripped by the article to be labeled when the same reaches a predetermined position, two sets of vertically reciprocating label pickers, means for applying paste to said pickers during their upward stroke, means for supplying labels to the pickers while they are at rest at their highest position, means for temporarily holding the pickers at rest when in their highest and lowest positions, a transversely moving pusher plate which pushes articles to be labeled against the label, presser means for holding the labels on the articles while they are being removed from the pickers, and means for causing the pusher plate to recede from its maximum outward throw to release the labeled article between the presser means and said plate, all of said operations being controlled by the said tripping mechanism, substantially as described.

28. A label-applying machine having a feed-in conveyer for feeding in the articles to be labeled in a single row, a tripping mechanism arranged to be automatically tripped by the article to be labeled when same reaches a predetermined position, two sets of vertically reciprocating label pickers, means for applying paste to said pickers during their upward stroke, means for supplying labels to the pickers while they are at rest in their highest position, means for temporarily holding the pickers at rest while at their highest and lowest positions, a transversely moving pusher plate which pushes the articles to be labeled against the label, presser means for holding the labels on the articles while they are being removed from the pickers, and means for causing the pusher plate to recede from its maximum outward throw to release the labeled article between the presser means and said plate, all of said operations being controlled by the tripping mechanism, and two continuously operating conveyers substantially parallel with the feed-in conveyer and underneath the released position of the labeled article to remove said labeled article from between the presser arm and said pusher plate, substantially as described.

In testimony whereof I have hereunto set my hand.

EARL PORTER WETMORE.

Witnesses:
A. C. PARKER,
L. G. WILL.